US006197234B1

(12) United States Patent
Goudmand et al.

(10) Patent No.: US 6,197,234 B1
(45) Date of Patent: *Mar. 6, 2001

(54) METHOD FOR INCREASING THE ANTI-WETTABILITY OF A BODY

(75) Inventors: Pierre Goudmand; Odile Dessaux, both of Lille; Jean-Denis Quensierre, Croix; Vincent Bedhome, Desvres; Philippe Chavatte, Boulogne sur mer; José Duez, Doulogne sur mer, all of (FR)

(73) Assignee: Conte SA (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/874,100

(22) Filed: Jun. 12, 1997

(30) Foreign Application Priority Data

Jun. 28, 1996 (FR) .................................................. 96 08073

(51) Int. Cl.[7] .............................. B29C 71/02; B05D 3/04; B05D 3/10
(52) U.S. Cl. ........................... 264/83; 264/127; 427/222; 427/570; 427/575; 204/165; 204/177; 422/186.05
(58) Field of Search ..................................... 264/483, 423, 264/446, 447, 127, 82, 83; 427/213, 222, 569, 570, 575, 562; 204/164, 165, 177; 422/186.05

(56) References Cited

U.S. PATENT DOCUMENTS

| 4,264,750 | * | 4/1981 | Anand et al. ......................... 525/356 |
| 4,508,781 | * | 4/1985 | Yagi et al. ............................ 428/409 |
| 5,147,678 |   | 9/1992 | Foerch et al. . |
| 5,360,455 |   | 11/1994 | Hannemann et al. . |
| 5,376,413 | * | 12/1994 | Callebert et al. ..................... 427/489 |
| 5,447,756 |   | 9/1995 | Kamen . |
| 5,693,273 | * | 12/1997 | Wolbrom .............................. 264/113 |

FOREIGN PATENT DOCUMENTS

| 4141805 | 6/1993 | (DE) . |
| 0254424 | 1/1988 | (EP) . |
| 0343038 | 11/1989 | (EP) . |

OTHER PUBLICATIONS

Andre Ricard et al., EP 305 241 A1 (abstract only), Mar. 1, 1989.*

* cited by examiner

Primary Examiner—Jan H. Silbaugh
Assistant Examiner—Kenneth M. Jones
(74) Attorney, Agent, or Firm—Banner & Witcoff, Ltd.

(57) ABSTRACT

To increase the anti-wettability of a body vis a vis a fluid the body is subjected in a treatment enclosure to a post-discharge nitrogen plasma. A fluorinated vapor is fed into the plasma on the input side or on the output side of the discharge cavity.

8 Claims, 2 Drawing Sheets

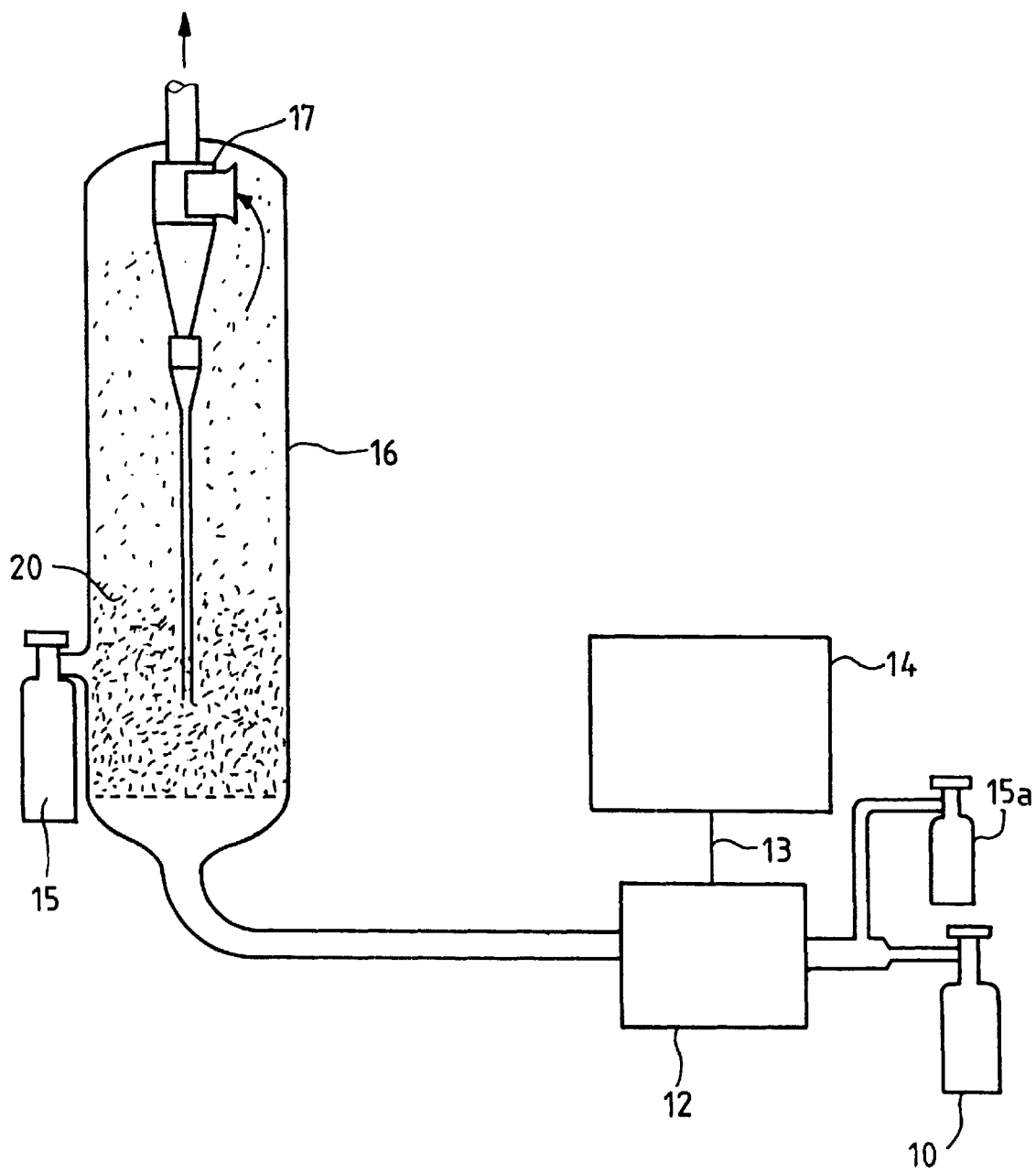
FIG_1

FIG_2
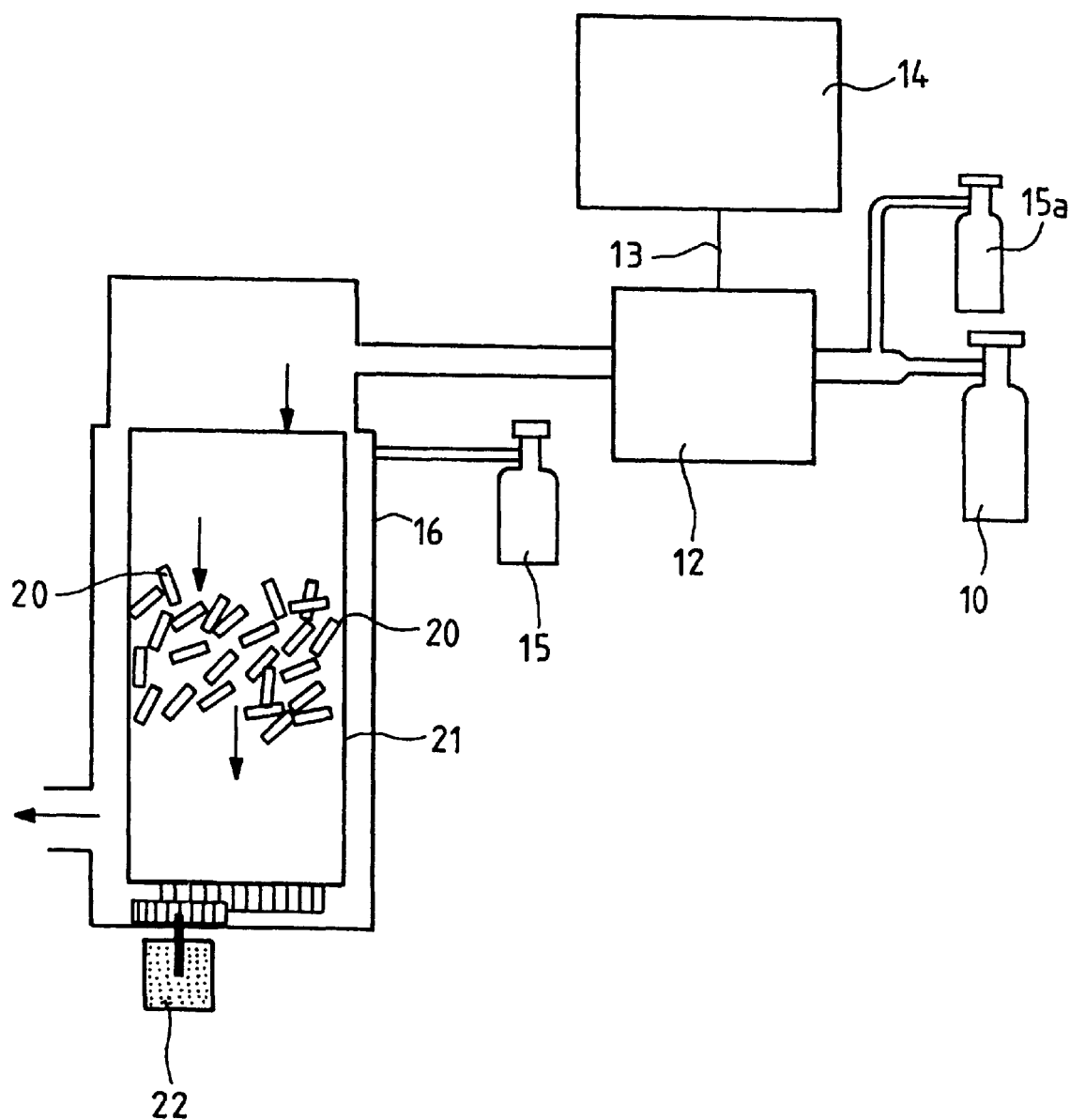

METHOD FOR INCREASING THE ANTI-WETTABILITY OF A BODY

BACKGROUND OF THE INVENTION

1. Field of the invention

The present invention concerns a method of increasing the anti-wettability of a body—i.e. of making it more hydrophobic vis a vis a fluid.

The invention is also directed to the bodies obtained after treatment by the method of the invention.

These bodies can be porous bodies treated directly by a plasma process or bodies obtained by sintering balls treated by a plasma process.

2. Description of the prior art

It is desirable to increase the wettability of a porous body vis a vis a fluid in many applications.

One of these applications concerns the writing tips of markers. French patent application n° 96 01 700 of Feb. 12, 1996 describes a method of increasing the wettability of a porous body such as the writing tip of a marker vis a vis the ink. This method consists in subjecting the porous body to a post-discharge nitrogen plasma.

In contrast, the present invention is directed to increasing the anti-wettability of a porous body, i.e. to reducing its ability to absorb a fluid.

European patents 0 516 538 and 0 681 924 describe a marker having a body enclosing an ink reservoir and a tip having one end in contact with the ink and surrounded by a porous polymer material sleeve.

The Applicant has found that the marker works better if the anti-wettability of the aforementioned porous sleeve vis a vis the ink is increased.

The invention is specifically directed to achieving this particular objective, without limiting its application to the above example.

SUMMARY OF THE INVENTION

In the method of the invention of increasing the anti-wettability of a body relative to a fluid the body is subjected in a treatment enclosure to a post-discharge nitrogen plasma into which a fluorinated vapor is fed on the input side or on the output side of the discharge cavity.

Surprisingly, it has been found that subjecting a body to a plasma generated in the post-discharge area in a gas containing a fluorinated gaseous compound increases the anti-wettability of said body, which is the opposite of what is obtained in a pure nitrogen plasma.

The post-discharge area is an area remote from the discharge area proper. In this post-discharge area, the active atomic or molecular species are neutral (non-ionized).

The bodies treated can be porous polymer material bodies or a polymer powder in the form of balls.

The fluorinated gas can be a carbon polyfluoride or a nitrogen fluoride ($NF_3$)

The pressure of the gas in the treatment enclosure is preferably between 1 hectopascal and 200 hectopascals.

In the case of the powder, it is preferable for the latter to be in suspension in the treatment enclosure, for example in a fluidized bed or in a rotating reactor.

After treatment of the powder in the treatment enclosure, the powder is agglomerated by sintering to produce a body having the required shape.

The invention also consists in a sintered body consisting entirely or partly of balls treated by the method of the invention.

The invention also consists in a sintered body consisting partly of balls treated and sintered by the method of the invention and partly by balls treated and sintered by the method described in French patent application n° 96 01 700, i.e. treated with a nitrogen plasma.

A process of this kind is used to adjust the anti-wettability of the body.

Other features and advantages of the invention will emerge further from the following description, which is given by way of non-limiting example with reference to the accompanying drawings.

BRIEF DESCRIPTION OF THE DRAWINGS

FIG. 1 is a schematic showing a device for implementing the method of the invention.

FIG. 2 shows a variant of the device for implementing the method.

DETAILED DESCRIPTION OF THE PREFERRED EMBODIMENT

There will first be described with reference to FIG. 1 an installation for implementing a method of increasing the anti-wettability of a powder 20 vis à vis a fluid.

This installation includes a nitrogen source 10 connected to a discharge cavity 12. The wave generator 14 produces an electromagnetic wave in the discharge cavity 12.

A very wide range of frequencies can be used: microwave frequencies in the order of 880 MHz–915 MHz or 2450 MHz are generally chosen. Lower frequencies, in the order of 13.56 MHz, 27.12 MHz or 433 MHz, can equally well be used.

A tubular waveguide 13 is provided between the output of the generator 14 and the discharge cavity 12. A water circulator is provided around the tubular waveguide to cool it.

The discharge cavity 12 is connected by a pipe to the treatment enclosure 16 containing the powder 20 to be treated. A fluorinated vapor 15 such as $NF_3$ or carbon polyfluoride is introduced into the enclosure 16. The fluorinated compound can equally well be fed to a point on the input side of the discharge cavity 12, as shown at 15a in FIG. 1.

The treatment enclosure 16 is connected to a vacuum pump for reducing the pressure in the enclosure 16.

The powder 20 is in suspension in a fluidized bed.

A cyclone 17 is provided in the enclosure 16, upstream of its output, to prevent the powder 20 being sucked in by the vacuum pump.

When the method of the invention is implemented by the device described above, the powder 20 is subjected to a plasma in a fluorinated gas in the treatment enclosure 16, i.e. to a remote non-ionic post-discharge plasma.

The pressure of the gas in the treatment enclosure is preferably between 1 hectopascal and 200 hectopascals.

After treatment of the powder in the treatment enclosure 16, the powder is agglomerated by sintering to produce a body having the required shape.

Instead of the powder being in suspension in a fluidized bed, it can be in suspension in a reactor 21 rotated by a motor 22 as shown in FIG. 2.

FIG. 2 illustrates the treatment of polymer or composite polymer material porous bodies.

The porous bodies 20 and the sintered bodies made from a powder, treated by the method of the invention, have an increased anti-wettability (i.e. an increased hydrophobic character).

This result is explained a posterior by the action of the fluorine elements in the plasma, the effect of which is the opposite of that procured by a nitrogen plasma.

In accordance with another feature of the invention, sintered bodies can also be made consisting partly of powder or balls treated by the method of the invention and partly of powder or balls treated by subjecting them to a plasma generated by an electromagnetic wave discharge in a gas consisting essentially of nitrogen, as described in French patent application n° 96 01 700.

The balls treated by the two methods described above can be mixed together before sintering. This produces a sintered body having a hydrophilic and hydrophobic character.

By adjusting the relative proportions of the balls treated by the two methods, a sintered body can be obtained having a more or less accentuated hydrophilic Dr hydrophobic character.

Instead of mixing the balls treated by the above two methods, the balls may also be arranged in successive layers to produce a sintered body in which the anti-wettability increases progressively with depth.

The porous or sintered bodies treated by the method of the invention can be used in many applications.

Of course, the invention is not limited to the examples just described and many modifications may be made to these without departing from the scope of the invention.

There is claimed:

1. A method for increasing the anti-wettability of a porous body previously made with a sintered polymeric powder comprising:

providing the porous body in a treatment enclosure, generating a non-ionic post-discharge nitrogen plasma by an electromagnetic wave discharge with a nitrogen-containing gas, wherein said non-ionic post-discharge nitrogen plasma further contains a fluorinated vapor, feeding said non-ionic post-discharge nitrogen plasma to said treatment enclosure, and exposing said porous body to said non-ionic post-discharge nitrogen plasma to form a porous body having an increased anti-wettability.

2. The method of claim 1 wherein said fluorinated vapor is a carbon polyfluoride.

3. The method of claim 1 wherein said fluorinated vapor is $NF_3$.

4. The method of claim 1 wherein the pressure of said nitrogen-containing gas in said treatment enclosure is between 1 hectopascal and 200 hectopascal.

5. A method for increasing the anti-wettability of a porous body made with a sintered polymeric powder comprising:

providing the polymeric powder in a treatment enclosure, generating a non-ionic post-discharge nitrogen plasma by an electromagnetic wave discharge with a nitrogen-containing gas, wherein said non-ionic post-discharge nitrogen plasma further contains a fluorinated vapor, feeding said non-ionic post-discharge nitrogen plasma to said treatment enclosure, exposing said polymeric powder to said non-ionic post-discharge nitrogen plasma, and sintering said polymeric powder to form a porous body having an increased anti-wettability.

6. The method of claim 5 wherein said fluorinated vapor is carbon polyfluoride.

7. The method of claim 5 wherein said fluorinated vapor is $NF_3$.

8. The method of claim 5 wherein the pressure of said nitrogen-containing gas in said treatment enclosure is between 1 hectopascal and 200 hectopascal.

* * * * *